(12) United States Patent
Flehmig et al.

(10) Patent No.: US 9,734,719 B2
(45) Date of Patent: Aug. 15, 2017

(54) METHOD AND APPARATUS FOR GUIDING A VEHICLE IN THE SURROUNDINGS OF AN OBJECT

(71) Applicant: Robert Bosch GmbH, Stuttgart (DE)

(72) Inventors: Folko Flehmig, Stuttgart (DE);
Thomas Gussner, Ludwigsburg (DE);
Yuefeng Ma, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/781,986

(22) PCT Filed: Feb. 20, 2014

(86) PCT No.: PCT/EP2014/053292
§ 371 (c)(1),
(2) Date: Oct. 2, 2015

(87) PCT Pub. No.: WO2014/161691
PCT Pub. Date: Oct. 9, 2014

(65) Prior Publication Data
US 2016/0063865 A1    Mar. 3, 2016

(30) Foreign Application Priority Data

Apr. 3, 2013  (DE) .......................... 10 2013 205 882

(51) Int. Cl.
*G08G 1/16* (2006.01)
*H04N 13/02* (2006.01)

(52) U.S. Cl.
CPC ............. *G08G 1/167* (2013.01); *G08G 1/165* (2013.01); *G08G 1/166* (2013.01); *H04N 13/0203* (2013.01)

(58) Field of Classification Search
CPC ........ G08G 1/167; G08G 1/165; G08G 1/166; H04N 13/0203
See application file for complete search history.

(56) References Cited

U.S. PATENT DOCUMENTS

2010/0161225 A1*  6/2010  Hyung .................. G06T 7/2006
                                                        701/301

FOREIGN PATENT DOCUMENTS

| CN | 1921560 A | 2/2007 |
| CN | 1987357 A | 6/2007 |

(Continued)

OTHER PUBLICATIONS

Claudio Caraffi et al., << Off-Road Path and Obstacle Detection Using Decision Networks and Stereo Vision >>, IEEE Transactions on Intelligent Transportation System, vol. 8, No. 4, Dec. 1, 2007, pp. 607-618.

(Continued)

*Primary Examiner* — Michael D Lang
(74) *Attorney, Agent, or Firm* — Norton Rose Fulbright US LLP; Gerard Messina

(57) ABSTRACT

A method for guiding a vehicle in the surrounding environment of an object. The method includes reading in a multiplicity of view ray endpoints in a three-dimensional image, produced by a stereo camera of the vehicle, of a surrounding environment, containing the object, of the vehicle, at least one of the view ray endpoints representing an outer surface of the object, connecting the multiplicity of view ray endpoints to form a polygon that represents a free surface to be traveled by the vehicle, and generating a driving corridor, provided for the vehicle, for driving around the object, based on the free surface.

25 Claims, 5 Drawing Sheets

(56) References Cited

FOREIGN PATENT DOCUMENTS

| DE | 10 2009 022278 | 1/2010 |
|----|----------------|--------|
| DE | 10 2009 053 807 | 5/2011 |
| EP | 1 977 946 | 10/2008 |

OTHER PUBLICATIONS

Christoph G. Keller, et al. << Active Pedestrian Safety by Automatic Braking and Evasive Steering >>, >>, IEEE Transactions on Intelligent Transportation System, Bd. 12, No. 4, Dec. 1, 2011, pp. 1292-1304.

Olivier Aycard et al., << Intersection safety using lidar and stereo vision sensors >>, Intelligent Vehicles Symposium (IV), Jun. 5, 2011, pp. 863-869.

* cited by examiner ately activated steering moment that steers the (for example distracted) driver just around the obstacle extending into the roadway.
METHOD AND APPARATUS FOR GUIDING A VEHICLE IN THE SURROUNDINGS OF AN OBJECT

FIELD OF THE INVENTION

The present invention relates to a method for guiding a vehicle in the surrounding environment of an object, to a corresponding device, and to a corresponding computer program product.

BACKGROUND INFORMATION

There exist various systems that actively support the driver of the vehicle during transverse guidance of the vehicle. In particular, the systems LKS (Lane Keep System) and LDW (Lane Departure Warning) are known. These systems standardly react to lines, e.g. on highways and roads, acquired for example using a mono camera.

Patent document DE 10 2009 053 807 A1 discusses a method for supporting the driver of the vehicle during parking. The method is activated as soon as the driver puts the vehicle into reverse, and includes the recognition of obstacles in the area of the target trajectory determined by the steering angle, from the data of at least one environmental sensor and the application of a corrective steering moment in the direction pointing away from a recognized obstacle, in order to make it easier for the driver to avoid the obstacle.

SUMMARY OF THE INVENTION

Against this background, the present invention provides a method for guiding a vehicle in the surrounding environment of an object, as well as a device that uses this method, as well as, finally, a corresponding computer program product, according to the main claims. Advantageous embodiments result from the respective subclaims and from the following description.

Using a method that, based on a connection of points in a three-dimensional image of a surrounding environment of a vehicle, determines a virtual free surface for driving around an object that is changing in time, a driver of the vehicle can be effectively supported during transverse guiding, in particular in a city environment.

The method proposed here, and a corresponding system, can for example take into account an object in the form of a structure at the side of a road, in particular one that is changing, a door that is opening in the case of parked cars, a car leaving a parking space, or objects that are for example pushed into the roadway from between parked cars by pedestrians.

The aim of an assistance function that can be realized by the configuration proposed here can be, instead of an emergency evasive maneuver or an automatic emergency braking, merely an application of a limited, automatically activated steering moment that steers the (for example distracted) driver just around the obstacle extending into the roadway.

In this way, a subjective feeling of safety on the part of the driver, when passing closely by obstacles such as parked cars, can advantageously be increased by, for example, building up a detectable counter-moment on the steering wheel if the vehicle approaches too closely. With particular attention to obstacles in a city environment, such as parked cars, in the present application a configuration is proposed for advantageous handling of structures at the side of the road that are changing with time, such as when a door opens of a car parked at the side of the road.

A method for guiding of vehicle in the surrounding environment of an object has the following steps:

reading in a multiplicity of view ray endpoints in a three-dimensional image of a surrounding environment. containing the object, of the vehicle, the three-dimensional image representing an image produced by a stereo camera of the vehicle, and at least one of the view ray endpoints representing an outer surface of the object;

connection of the multiplicity of view ray endpoints in order to form a polygon that represents a free surface to be traveled by the vehicle; and generation of a driving corridor provided for the vehicle in order to drive around the object that is changing over time, based on the free surface.

The method is provided for example for use in a roadway vehicle such as a passenger car or truck. The object can be driven around using the driving corridor. Driving around the object can be understood as driving past the object with an adequate safety distance in order to ensure that the object or the vehicle is not damaged. The vehicle can drive around the object for example along a defined target trajectory. The driving around can in particular assume as a precondition a steering deflection on the part of the vehicle. The object can be understood as an obstacle that, during a time span of the duration of the driving around by the vehicle, changes in its perimeter or its characteristics, either in itself or in relation to the vehicle driving past. For example, a lateral distance between the vehicle and the object can change while the vehicle is driving past the object. This can take place because the object itself is moving, or because the object has an irregular outer contour on the side facing the vehicle. Thus, the object can be regarded as changing over time in itself, or as an object that is changing from the point of view of the vehicle. This change can in particular be such that it requires a steering movement for an evasive maneuver of the vehicle while passing by the object, or at least a preparedness to quickly carry out such a steering maneuver if circumstances require it. For example, the object can be a vehicle parked at the side of the road. Such an object can for example be capable of change over time in that, while the vehicle is passing by, a door of the parked vehicle may open into the street. A further object emerging into the roadway from a gap between two parked vehicles, or a person moving along the side of the road, can also be characterized as objects changing over time. Paths between the stereo camera and an endpoint of a range of view of the stereo camera can be designated view rays.

The end of the range of view can be determined for example in that an object situated at a particular distance in the view ray blocks the camera's view of an environment situated behind the object. Alternatively, the end of the range of view can also be characterized by an end of a region of view specified for the stereo camera, for example if a view ray is oriented towards an unobstructed horizon. The view ray endpoints can correspondingly designate positions in the three-dimensional image at which view rays going out from the stereo camera end due to one of the factors named above.

The surrounding environment of the vehicle can be a traffic scene relevant for the vehicle or a relevant structure, in particular a structure at the side of the road. The structure at the side of the road can include for example parked vehicles. The driving corridor can be a virtual traffic path to be traveled by the vehicle. Its shape and course can be based on a previously determined target trajectory for driving around the object. The driving corridor can be limited by virtual side edges that are solid or interrupted, within which the driving around of the object is accomplished. In order to ensure that the vehicle travels inside the driving corridor, a steering moment can be applied at a suitable position.

According to a specific embodiment, the method has a step of creating the three-dimensional image in the form of a disparity map based on a first image and a second image of the stereo camera. A prespecified distance value can be assigned to each of a multiplicity of points in the three-dimensional image. The first and the second image can each be a photograph of the environment in front of the vehicle taken by two optical sensors of the stereo camera for the stereoscopic reproduction of the surrounding environment. In order to represent the spatial depth, the disparity map can be made such that a specified color value is assigned to each distance value. In this way, the specific distances from objects contained in the three-dimensional image can be represented by colors or by parameters or values that can be electronically processed. The distance value can describe a distance of each sub-region of an object in the image from the vehicle, or from the stereo camera of the vehicle. With this specific embodiment, a distance-related assignment of imaged objects can be accomplished particularly easily and quickly.

In particular, the method can have a step of determining a selection of points from the multiplicity of points of the three-dimensional image that represents the object and/or an end of the range of view of the stereo camera as the multiplicity of view ray endpoints of the three-dimensional image. This specific embodiment has the advantage that through the determination of a few relevant points of the three-dimensional image, a shape, or dimension, of the free surface to be traveled by the vehicle can be determined and updated with a low computing expense.

For example, in the step of determination, the selection of the points can take place using a line-by-line scanning and column-by-column combination of the multiplicity of points of the three-dimensional image. In this specific embodiment, the points of the selection can be determined on the basis of verification via the column-by-column combination, with a low error rate.

In the step of determination, it is also possible to take into account, during the column-by-column combination, a relative speed between the vehicle and the object and/or the view ray endpoint, in order to compensate a line-by-line offset of the points within the three-dimensional image. In this way, it can be ensured that a shape, or dimension, of the free surface described by the polygon correctly reflects the actual local conditions at each point in time during the travel of the vehicle.

According to a further specific embodiment of the method, in the step of connection or in the step of determination a time-based filtering can be used. Using such a filtering, measurement errors can be removed from the determined free surface. This specific embodiment enables an advantageous real-time calculation and updating of the free surface at each point in time during travel of the vehicle.

For example, the time-based filtering can take place using a Kalman filter. In this way, relevant parameters can be well taken into account.

According to a further specific embodiment, in the step of generation a lateral edge of the driving corridor having a specified distance from the object can be determined. In this way, an additional safety distance from the object can easily be obtained in order to prevent, for example, very fast changes of the location of the object, which do not leave enough time for an adequate steering moment, from causing damage to the vehicle and/or to the object.

In the step of generation, in addition a size of the specified distance can be determined as a function of a classification of the object. Thus, the shape and course of the driving corridor can be adapted more precisely to the current conditions, and for example can run at a greater distance from the object if the object is for example classified as a person or as a vehicle, and can run at a smaller distance from the object if the object is for example classified as a plant. In this way, a feeling of safety on the part of a driver of the vehicle can advantageously be trained or improved.

A device for guiding a vehicle in the surrounding environment of an object has the following features:
a read-in device for reading in a multiplicity of view ray endpoints in a three-dimensional image of a surrounding environment of the vehicle containing the object, the three-dimensional image representing an image generated by a stereo camera of the vehicle, and at least one of the view ray endpoints representing an outer surface of the object;
a connecting device for connecting the multiplicity of view ray endpoints in order to form a polygon that represents a free surface to be traveled by the vehicle; and
a generating device for generating a driving corridor provided for the vehicle for driving around the object, based on the free surface.

The device can be fashioned to carry out or implement the steps of the method according to the present invention in its corresponding devices. The object of the present invention can also be rapidly and efficiently achieved by this variant embodiment of the present invention in the form of a device.

In the present context, a device can be understood as an electrical apparatus that processes sensor signals and, as a function thereof, outputs control and/or data signals. The device can have an interface that can be fashioned in terms of hardware and/or in terms of software. In the case of a realization in terms of hardware, the interfaces can for example be part of a so-called system ASIC containing a wide variety of functions of the device. However, it is also possible for the interfaces to be separate integrated circuits, or to be made up at least in part of discrete components. Given a realization as software, the interfaces can be software modules present for example on a microcontroller alongside other software modules.

Also advantageous is a computer program product having programming code that can be stored on a machine-readable carrier such as a semiconductor memory device, a hard drive, or an optical memory device, and that is used to carry out the method according to one of the specific embodiments described above when the program product is executed on a computer or on a device.

In the following, the present invention is explained in more detail in relation to examples, on the basis of the accompanying drawings.

DETAILED DESCRIPTION

Figure 1:
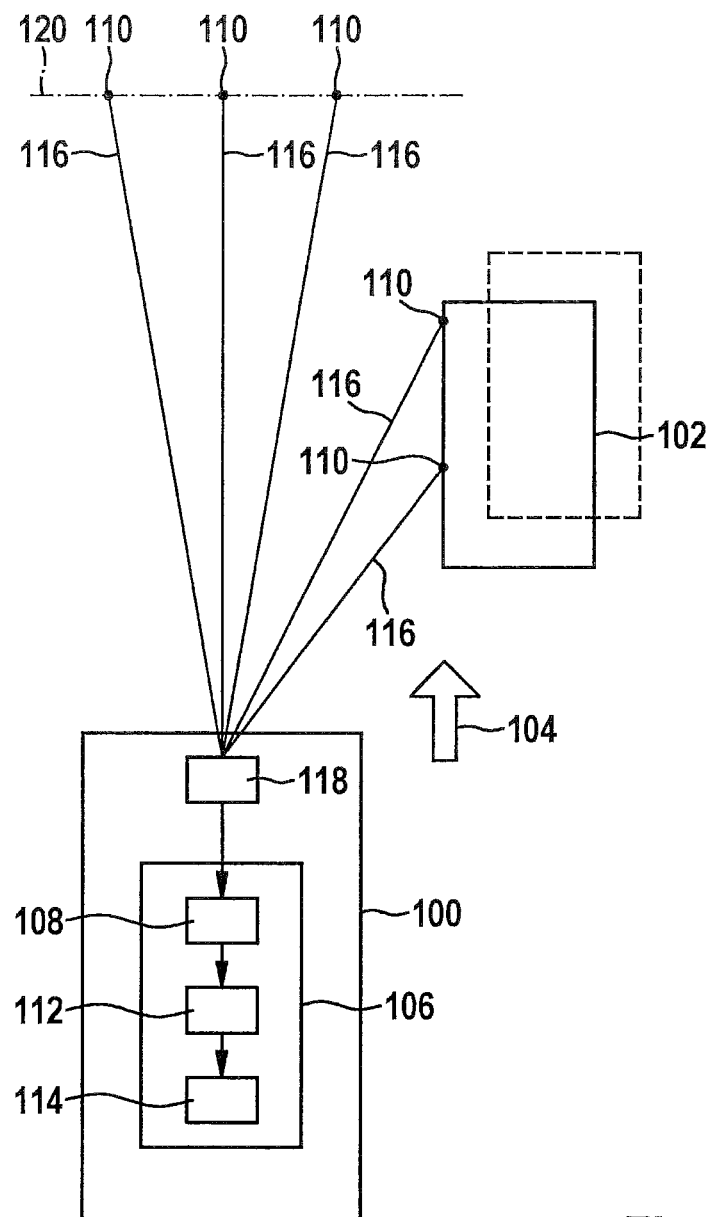
FIG. 1 shows a schematic diagram of a device for driving around an object according to an exemplary embodiment of the present invention.

In the following description of the exemplary embodiments of the present invention, identical or similar reference characters are used for the elements shown in the various Figures and having similar function, and repeated description of these elements is omitted.

FIG. 1 shows, in a simplified representation, an example of a traffic scene in which a vehicle 100 is just about to travel past an object 102 at the edge of the roadway. Vehicle 100 moves towards object 102 in a direction of travel 104, indicated by an arrow in the Figure. Object 102 is an object changing over time, i.e., it is changing its position relative to vehicle 100 while the vehicle moves past the object. As is indicated by a broken-line outline of object 102 changing over time, here object 102 is moving obliquely towards vehicle 100 at a current point in time of the travel of vehicle 100 past the object. In the exemplary embodiment shown in FIG. 1, object 102 is a vehicle leaving a parking space. However, object 102 changing over time can also be a person moving along the side of the roadway, or a bush extending into the roadway. According to a further exemplary embodiment, the change of position of object 102 relative to vehicle 100 also takes place without object 102 moving in itself, e.g. due to the opening of the driver door of a parked vehicle.

As FIG. 1 shows, vehicle 100 is equipped with a device 106 for guiding vehicle 100 in the surrounding environment of at least one object 102, and in particular for driving around at least one object 102 changing in time. Device 106 has a read-in device 108 for reading in a multiplicity of view ray endpoints 110, a connecting device 112 for connecting the multiplicity of view ray endpoints 110 to form a polygon, and a generating device 114 for generating a driving corridor for driving around object 102 changing in time. As can be seen from the representation, each of the view ray endpoints 110 identifies an end of a multiplicity of view rays 116 going out from a stereo camera 118 installed in vehicle 100. The number of view rays 116 shown in FIG. 1, and the number of the corresponding view ray endpoints 110, has been reduced to a few, for clarity only. Of course, in reality a large number of view rays 116 go out from camera 118. As can be clearly seen in FIG. 1, some of the view rays 116 going out from stereo camera 118 impinge on object 102, and end there. Correspondingly, view ray endpoints 110 of these view rays 116 represent an outer surface, or a segment of an outer surface, of object 102. In the exemplary embodiment shown in FIG. 1 of object 102 changing with time, view ray endpoints 110 represent areas of a body of vehicle 102 leaving a parking space. A further part of the view rays 116 going out from camera 118 can extend unhindered into the scene shown in FIG. 1, and in this way reach a view region end 120, shown by a dot-dash line in the representation, of stereo camera 118.

Device 106 is fashioned to generate, in a suitable device (not shown in the Figures), based on all the view ray endpoints 110, a three-dimensional image of a vehicle surrounding environment including object 102. In the form of a disparity map, such a three-dimensional image can represent distance values of view ray endpoints 110, on the basis of which a suitable driving trajectory can be calculated for driving around object 102 changing in time. This is described in more detail below on the basis of FIG. 2.

Read-in device 108 of device 106 reads in, via a suitable interface, an item of information of the multiplicity of view ray endpoints 110 from stereo camera 118, prepares the information for connecting device 112, and hands it to the connecting device via another suitable interface. Connecting device 112 connects the multiplicity of view ray endpoints 110 in order to form a polygon that forms a free surface to be traveled by vehicle 100, on the basis of which the driving corridor for driving around object 102 changing in time is determined in generating device 114, which is coupled to connecting device 112 via a further interface.

Figure 2:
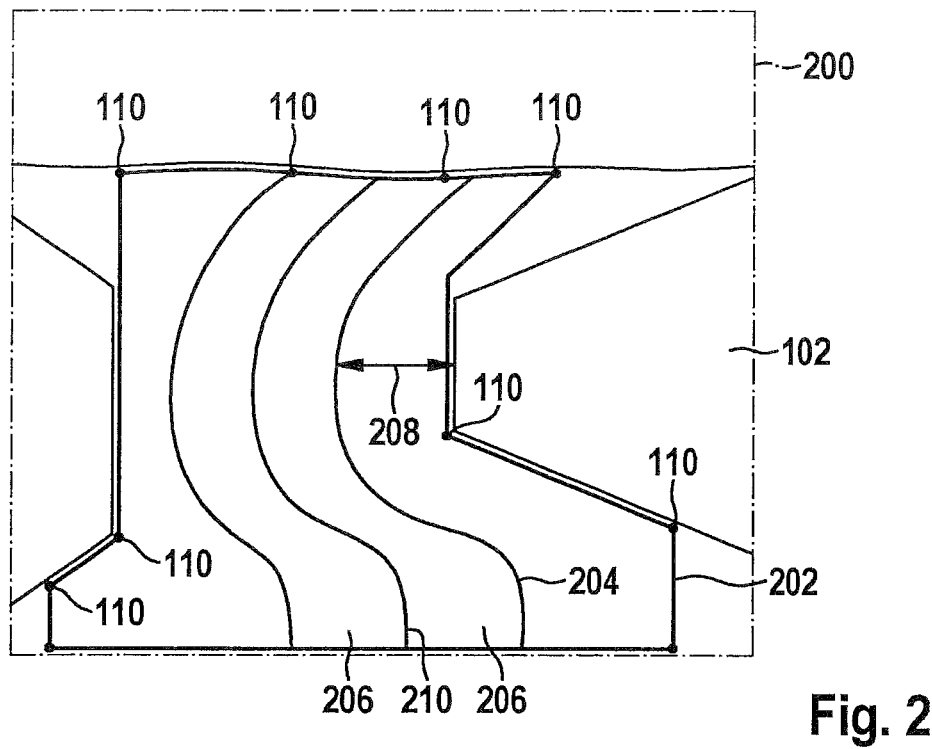
FIG. 2 shows a schematic representation of a three-dimensional image having a polygon that forms a free surface to be traveled by the vehicle, according to an exemplary embodiment of the present invention.

FIG. 2 shows, in a simplified representation, a three-dimensional image 200 of an example of a surrounding environment of the vehicle of FIG. 1. Three-dimensional image 200 is based on images recorded by each of two optical sensors of the stereo camera of FIG. 1, and is present in the form of a disparity map. Object 102, changing in time, of FIG. 1, situated at the side of the roadway and to be driven around, is shown at the right edge of the image. In addition, disparity map 200 shows at the left image edge a further object situated at an opposite side of the roadway. Disparity map 200 is composed of a large number of points, a specified distance value being assigned to each point. The representation in FIG. 2 shows a large number of view ray endpoints 110, selected for example through line-by-line scanning of three-dimensional image 200, and determined through column-by-column combination of the selection. According to the determination, the view ray endpoints 110 shown at top in image 200 represent an end of a region of view of the camera, and the further shown view ray endpoints 110 represent outer regions of object 102, as well as of the further object. Using a time-based filtering, carried out by a Kalman filter, view ray endpoints 110 are connected to form a polygon that forms a free surface 202 to be traveled by the vehicle.

Based on free surface 202, at a sufficient distance from object 102 side edges 204 are generated of a driving corridor 206 in which the vehicle travels around object 102. As is shown in FIG. 2, in this exemplary embodiment driving corridor 206 has been generated in such a way that it has a specified distance 208, identified by a double arrow, from object 102. According to an exemplary embodiment of the present invention, driving corridor 206 is determined based on a target trajectory 210 running at a suitable distance from the object. According to this embodiment, a steering moment is activated when the driver of the vehicle departs from target trajectory 210 while driving around object 102. In the exemplary embodiment of the device presented herein, explained on the basis of the representation in FIG. 2, the size of distance 208 is a function of a classification that has been made of the object changing in time. Because here object 102 has been classified as a vehicle leaving a parking space, distance 210 is larger than it would be if object 102 had been classified as, for example, a bush.

Figure 3:
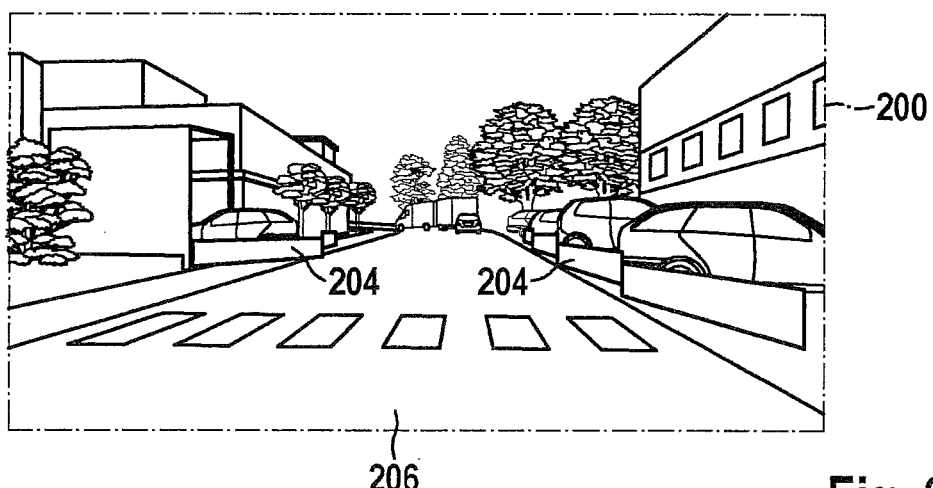
FIG. 3 shows a representation of lateral edges of a driving corridor for driving around objects, according to an exemplary embodiment of the present invention.

FIG. 3 shows a representation of a left and right lateral edge 204 of an exemplary embodiment of driving corridor 206 of FIG. 2. The representation in FIG. 3 shows a three-dimensional image 200 of a city scenario.

Shown is a roadway, as well as different obstacles at the left and at the right of the roadway, here in the form of a structure at the side of the road, parked vehicles, and persons moving between the parked vehicles and the roadway. In the representation in FIG. 3, lateral edges 204 of driving corridor 206 are shown as virtual gray "strips" for the illustration of the configuration presented herein. Driving corridor edges 204 here bridge gaps between the obstacles, which the vehicle could physically pass through, but which probably will not be traveled. Lateral edges 204 thus form a gapless boundary for corridor 206. A course of lateral edges 204 was generated based on various classifiers relating to the roadside structures, parked vehicles, and moving persons. Lateral edges 204 shown in the representation can be made visible to the driver of the vehicle for example using a field of view display or a head-up display. However, this is not necessary for a function of the device presented here, or of a corresponding method.

Figure 4:
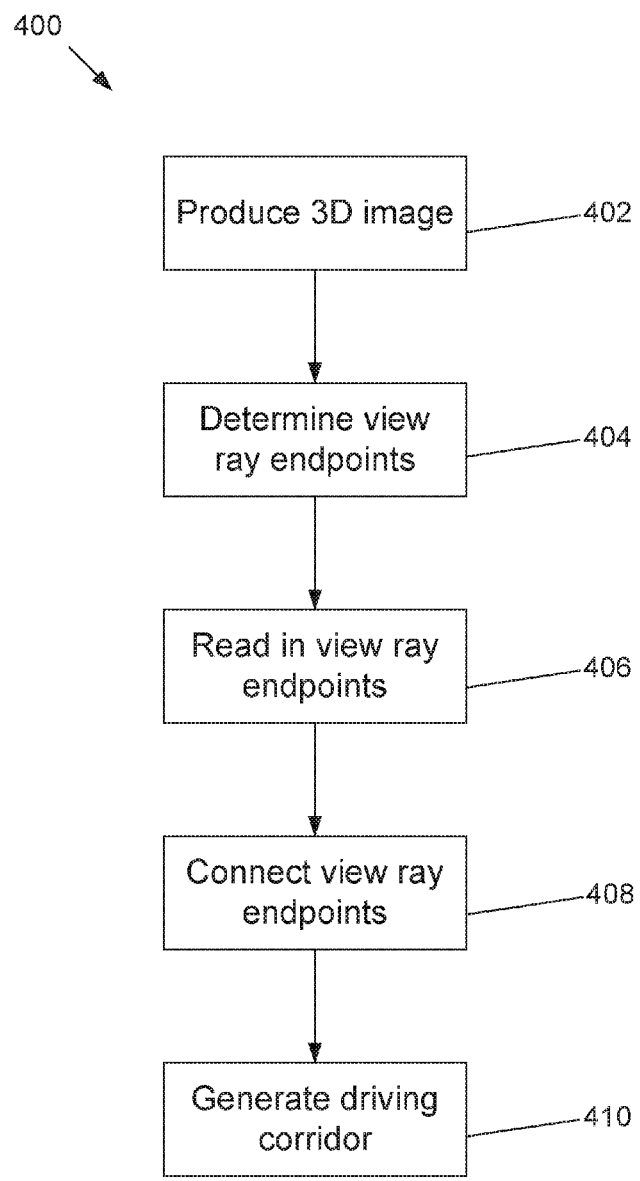
FIG. 4 shows a flow diagram of a method for driving around an object according to an exemplary embodiment of the present invention.

FIG. 4 shows a flow diagram of an exemplary embodiment of a method 400 for driving around an object changing in time, or for guiding a vehicle in the surrounding environment of an object. In a step 402, based on a first image and a second image of a stereo camera of a vehicle, a three-dimensional image of a surrounding environment of the vehicle containing the object is produced in the form of a disparity map, a specified distance value being assigned to each of a large number of points of the three-dimensional image. In step 404, a selection of these points is determined as a multiplicity of view ray endpoints of the three-dimensional image. Here, at least one of the view ray endpoints represents a region of an outer surface of the object. In a step 406, the multiplicity of view ray endpoints is read into a read-in device of a device that is executing method 400. The individual view ray endpoints are subsequently connected, in a step 408, in a connecting unit of the device in order to form a polygon. This polygon represents a free surface to be traveled by the vehicle. Based on this free surface, in a step 410 in a generating unit of the device a driving corridor is generated for driving around the object changing in time.

Figure 5:
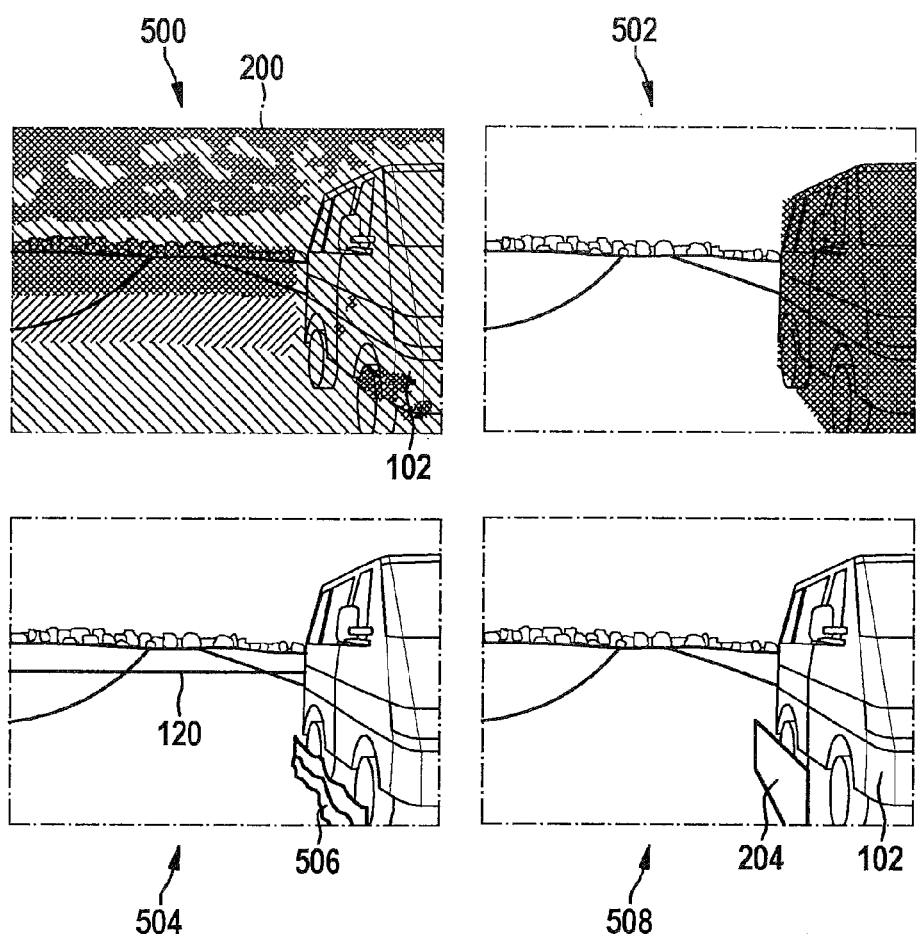
FIG. 5 shows images representing intermediate results of algorithms of the method of FIG. 3.

FIG. 5 shows a series of images representing intermediate results of algorithms of the method of FIG. 3, according to an exemplary embodiment of the present invention. A first image 500 shows an exemplary embodiment of three-dimensional image 200 of an example of a vehicle surrounding environment in the form of a disparity map as used in a stereo camera. In disparity map 200, in the right half of the image object 102 changing in time is shown as a vehicle. The rest of disparity map 200 shows a course of a roadway extending to the horizon. The column-by-column acquisition of the obstacles can be seen clearly on the basis of the structuring in a second image 502 of the surrounding environment of the vehicle. A third image 504 of the vehicle surrounding environment shows boundaries of the time-filtered free surface, one, of the type "obstacle," in the form of a strip 506 along object 102, and one of the type "end of region of view" having a node line along the horizon, here representing the end 120 of the region of view of the camera. A fourth image 508 shows an example of a right lateral edge 204 of a driving corridor for driving around object 102 changing in time.

Figure 6:
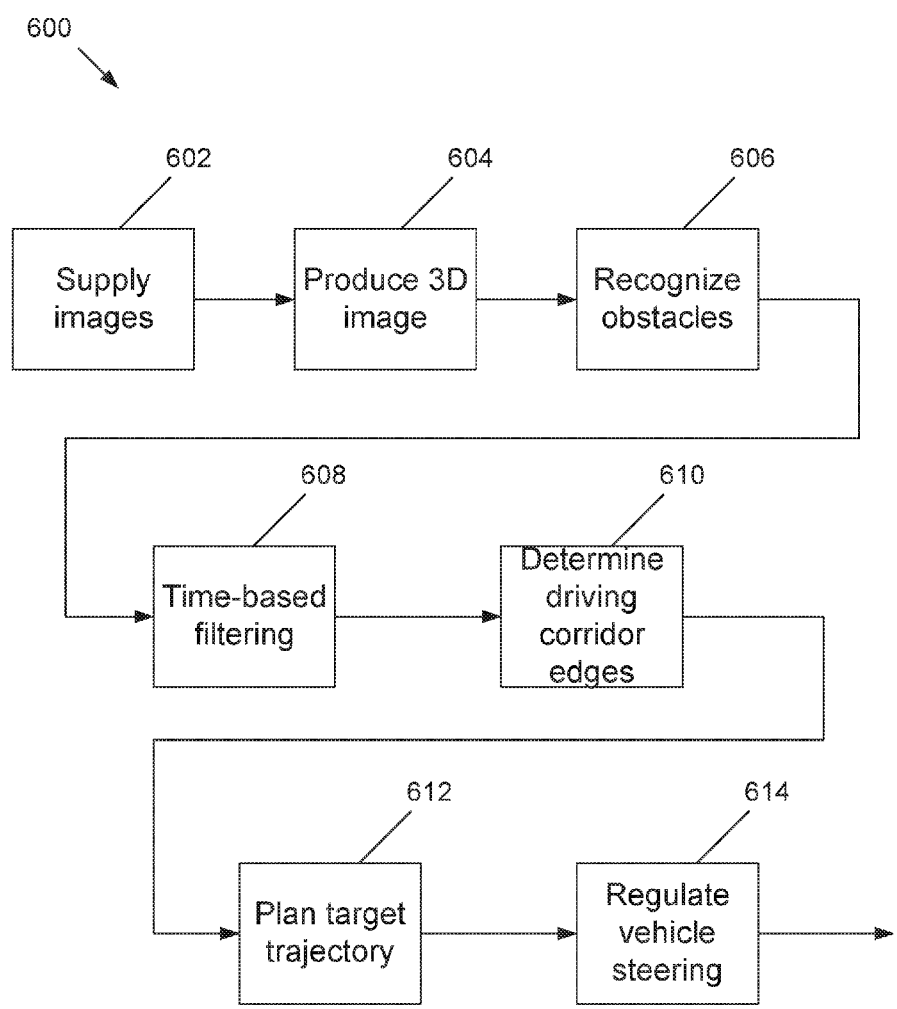
FIG. 6 shows an overview of the entire system for driving around an object according to an exemplary embodiment of the present invention.

FIG. 6 shows an overview of a functional sequence 600 of an overall system for driving around an object changing in time according to an exemplary embodiment of the present invention. In a first functional segment 602, the stereo camera of the vehicle supplies two images. The disparity calculation in a second functional segment 604 yields a 3-D representation of the environment situated in the camera acquisition range. From this, obstacles are recognized in a third functional segment 606 in column-by-column fashion in the image. From this, and from vehicle data such as yaw rate and speed, in a fourth functional segment 608 the time-based filtering calculates a free surface, represented as a polygon. From the free surface, in a fifth functional segment 610 a right and left driving corridor edge—here with additional safety distances—are estimated or determined. Within this driving corridor, in a sixth functional segment 612 a collision-free target trajectory is planned that, in a seventh functional segment 614, is regulated by a regulating unit of the vehicle, making use of a steering moment.

In the following, the configuration presented herein of the expanded transverse guiding assistance in a city environment with changing roadside structures is again described on the basis of an exemplary embodiment and with reference to all the Figures.

A system that uses method 400 according to the present invention uses stereo camera 118 as environmental sensor. From disparity map 200, for each image line of the image, rectified under some circumstances, it is determined whether a collision-relevant obstacle 102 is present, and what its position is relative to home vehicle 100. In order to filter out outliers and to reduce the influence of measurement noise, these obstacles 102, present column-by-column, are filtered using a Kalman filter, and a filtered free surface 202 is calculated therefrom. This free surface 202 is represented as a polygon. The vertices 110 of the polygon correspond to view rays 116 going out from camera 118. Each view ray 116 or vertex 110 of the polygon has either the property that it marks the end of region of view 120 of camera 118, if no obstacle has been detected, or that it indicates the position of the closest obstacle 102. The filtering is first carried out separately for each image line, or each view ray 116. Because home vehicle 100 is however in motion, before each filtering update the filtered free surface 202 first has to be shifted by the movement of home vehicle 100. Because free surface polygon 202 now no longer has the property that each node point 110 corresponds to an image column, the polygon is subsequently newly scanned in such a way that this is again the case.

In order to make it possible to react to changing roadside structures, such as an opening door of a vehicle, the parameters of the Kalman filter are set such that the filtered free surface 202 can follow the changing obstacles 102 quickly enough. This property is set in particular via a covariance matrix of the state noise in the Kalman filter. The entries in this matrix are correspondingly dimensioned sufficiently large. Measurement outliers are sorted out by gating before the filter update. Moreover, for subsequent calculating steps, only those node points 110 of free surface 202 are used whose variance is below a maximum value.

Based on the filtered free surface polygon 202, driving corridor 206 is determined that is described by right and left driving corridor edge 204. Driving corridor edges 204 can for example also bridge gaps between obstacles 102 that vehicle 100 could physically travel through, but that probably will not be traveled.

After the determination of the driving corridor, safety distances 208 are added to both driving corridor edges 204 in order to ensure that the roadside structures are passed with an adequate safety distance, e.g. 30 cm.

If, according to an exemplary embodiment of the present invention, a suitable mono-classifier is available for the roadside structures, then this safety distance 208 is selected as a function of the object. Thus, when traveling past parked cars a greater safety distance can be selected than when traveling past bushes.

With the aid of the above-described determined driving corridor edges 204, according to an exemplary embodiment of the method presented herein the target trajectory 210 between driving corridor edges 204 is planned that results in a target yaw rate that is as small as possible, so that vehicle 100 does not contact or intersect driving corridor edges 204 when it follows target trajectory 210. Finally, target trajectory 210 is regulated by a regulator, by setting a steering moment, comparable to an LKS system. The function forms a virtual wall against which the driver "leans." Because target trajectory 210 is newly calculated in each cycle, a changing roadside structure, such as an opening door, is reacted to by an instantaneously adapted target trajectory 210. In this way, correspondingly adapted regulator steering moments are immediately adapted. Vehicle 100 is then steered around the newly appearing obstacle 102.

The described approach can be used in a driver assistance system, for example also as an expansion of a so-called construction site assistant.

The exemplary embodiments described and shown in the Figures have been chosen only as examples. Different exemplary embodiments can be combined with one another in their entirety or with regard to individual features. An exemplary embodiment can also be supplemented with features of a further exemplary embodiment.

In addition, method steps according to the present invention can be repeated, and can be executed in a sequence differing from the described sequence.

If an exemplary embodiment includes an "and/or" linkage between a first feature and a second feature, this is to be read as meaning that according to a first specific embodiment the exemplary embodiment has both the first feature and also the second feature, and according to a further specific embodiment the exemplary embodiment has either only the first feature or only the second feature.

What is claimed is:

1. A method for guiding a vehicle in a surrounding environment of an object, the method comprising:
    reading in a multiplicity of view ray endpoints in a three-dimensional image of the surrounding environment, containing the object and/or the vehicle, the three-dimensional image representing an image produced by a stereo camera of the vehicle, and at least one of the view ray endpoints representing an outer surface of the object;
    connecting the multiplicity of view ray endpoints to form a polygon that represents a free surface to be traveled by the vehicle, wherein one or more sides of the polygon define an edge of the free space, the one or more sides defining a boundary between the polygon and the object; and
    generating a driving corridor, provided for the vehicle, for driving around the object, based on the free surface, wherein the generating of the driving corridor includes:
        determining a safety distance between the vehicle and the one or more sides of the polygon, wherein a size of the safety distance varies as a function of a classification of the object, and
        defining at least one lateral edge of the driving corridor, a distance between the at least one lateral edge of the driving corridor and the one or more sides of the polygon corresponding to the safety distance.

2. The method of claim 1, further comprising:
    producing the three-dimensional image in the form of a disparity map based on a first image and a second image of the stereo camera, a specified distance value being assigned to each of a multiplicity of points of the three-dimensional image.

3. The method of claim 2, further comprising:
    determining a selection of points from the multiplicity of points of the three-dimensional image, which represent an end of a region of view of the stereo camera, as the multiplicity of view ray endpoints of the three-dimensional image.

4. The method of claim 3, wherein in the determining, the selection of the points takes place through line-by-line scanning and column-by-column combining of the multiplicity of points of the three-dimensional image which represent the end of the region of view.

5. The method of claim 4, wherein in the determining, in the column-by-column combining a relative speed between the vehicle and the end of the region of view is taken into account to compensate a line-by-line offset of the points inside the three-dimensional image.

6. The method of claim 1, wherein a time-based filtering is used in the connecting or in the determining.

7. The method of claim 6, wherein a Kalman filter performs the time-based filtering.

8. The method of claim 1, wherein the generated driving corridor has left and right lateral edges respectively corresponding to left and right sides of the vehicle.

9. The method of claim 1, wherein a first lateral edge of the driving corridor is generated based on obstacles on a first side of the vehicle, and a second lateral edge of the driving corridor is generated based on obstacles on a second side of the vehicle, opposite to the first side.

10. The method of claim 1, further comprising:
    performing line-by-line scanning of the three-dimensional image and column-by-column combining of a multiplicity of points of the three-dimensional image;
    determining a selection of the multiplicity of view ray endpoints of the three-dimensional image which represent the object based on the line-by-line scanning of the three-dimensional image and the column-by-column combining of the multiplicity of points of the three-dimensional image; and
    compensating a line-by-line offset of the points inside the three-dimensional image by taking into account a relative speed between the vehicle and the object in the column-by-column combining of the multiplicity of points.

11. The method of claim 1, wherein a specified color value is assigned to each specified distance value to represent a spatial depth of the three-dimensional image.

12. A device for guiding a vehicle in a surrounding environment of an object, comprising:
    a read-in device configured to read in a multiplicity of view ray endpoints in a three-dimensional image of the surrounding environment, containing the object and/or the vehicle, the three-dimensional image representing an image produced by a stereo camera of the vehicle, and at least one of the view ray endpoints representing an outer surface of the object;
    a connecting device configured to connect the multiplicity of view ray endpoints to form a polygon that represents a free surface to be traveled by the vehicle, wherein one or more sides of the polygon define an edge of the free space, the one or more sides defining a boundary between the polygon and the object; and
    a generating device configured to generate a driving corridor, provided for the vehicle, for driving around the object, based on the free surface, wherein the generating of the driving corridor includes:
        determining a safety distance between the vehicle and the one or more sides of the polygon, wherein a size of the safety distance varies as a function of a classification of the object, and defining at least one lateral edge of the driving corridor, a distance between the at least one lateral edge of the driving corridor and the one or more sides of the polygon corresponding to the safety distance.

13. The device of claim 12, wherein the generated driving corridor has left and right lateral edges respectively corresponding to left and right sides of the vehicle.

14. The method of claim 12, wherein a first lateral edge of the driving corridor is generated based on obstacles on a first side of the vehicle, and a second lateral edge of the driving corridor is generated based on obstacles on a second side of the vehicle, opposite to the first side.

15. The device of claim 12, further configured to:

perform line-by-line scanning of the three-dimensional image and column-by-column combining of a multiplicity of points of the three-dimensional image;

determine a selection of the multiplicity of view ray endpoints of the three-dimensional image which represent the object based on the line-by-line scanning of the three-dimensional image and the column-by-column combining of the multiplicity of points of the three-dimensional image; and compensate a line-by-line offset of the points inside the three-dimensional image by taking into account a relative speed between the vehicle and the object in the column-by-column combining of the multiplicity of points.

16. A non-transitory computer readable medium having a computer program, which is executable by a processor, comprising:

a program code arrangement having program code for computer program product having program code guiding a vehicle in a surrounding environment of an object, by performing the following:

reading in a multiplicity of view ray endpoints in a three-dimensional image of the surrounding environment, containing the object and/or the vehicle, the three-dimensional image representing an image produced by a stereo camera of the vehicle, and at least one of the view ray endpoints representing an outer surface of the object;

connecting the multiplicity of view ray endpoints to form a polygon that represents a free surface to be traveled by the vehicle, wherein one or more sides of the polygon define an edge of the free space, the one or more sides defining a boundary between the polygon and the object; and generating a driving corridor, provided for the vehicle, for driving around the object, based on the free surface, wherein the generating of the driving corridor includes:

determining a safety distance between the vehicle and the one or more sides of the polygon, wherein a size of the safety distance varies as a function of a classification of the object, and defining at least one lateral edge of the driving corridor, a distance between the at least one lateral edge of the driving corridor and the one or more sides of the polygon corresponding to the safety distance.

17. The computer readable medium of claim 16, wherein the generated driving corridor has left and right lateral edges respectively corresponding to left and right sides of the vehicle.

18. The method of claim 16, wherein a first lateral edge of the driving corridor is generated based on obstacles on a first side of the vehicle, and a second lateral edge of the driving corridor is generated based on obstacles on a second side of the vehicle, opposite to the first side.

19. The computer readable medium of claim 16, further comprising program code configured to:

perform line-by-line scanning of the three-dimensional image and column-by-column combining of a multiplicity of points of the three-dimensional image;

determine a selection of the multiplicity of view ray endpoints of the three-dimensional image which represent the object based on the line-by-line scanning of the three-dimensional image and the column-by-column combining of the multiplicity of points of the three-dimensional image; and compensate a line-by-line offset of the points inside the three-dimensional image by taking into account a relative speed between the vehicle and the object in the column-by-column combining of the multiplicity of points.

20. A method for guiding a vehicle in a surrounding environment of an object, the method comprising:

producing a three-dimensional image in the form of a disparity map based on a first image and a second image of a stereo camera, a specified distance value being assigned to each of a multiplicity of points of the three-dimensional image;

reading in a multiplicity of view ray endpoints in the three-dimensional image of the surrounding environment, containing the object and/or the vehicle, and at least one of the view ray endpoints representing an outer surface of the object;

determining a selection of points from the multiplicity of points of the three-dimensional image, which represent the object and/or an end of a region of view of the stereo camera, as the multiplicity of view ray endpoints of the three-dimensional image, wherein in the determining, the selection of the points takes place through line-by-line scanning and column-by-column combining of the multiplicity of points of the three-dimensional image and, in the column-by-column combining, a relative speed between the vehicle and the object and/or the end of the region of view is taken into account to compensate a line-by-line offset of the points inside the three-dimensional image;

connecting the multiplicity of view ray endpoints to form a polygon that represents a free surface to be traveled by the vehicle; and generating a driving corridor, provided for the vehicle, for driving around the object, based on the free surface.

21. The method of claim 20, wherein one or more sides of the polygon define an edge of the free space, the one or more sides defining a boundary between the polygon and the object, and wherein the generating of the driving corridor includes:

determining a safety distance between the vehicle and the one or more sides of the polygon, wherein a size of the safety distance varies as a function of a classification of the object, and defining at least one lateral edge of the driving corridor, a distance between the at least one lateral edge of the driving corridor and the one or more sides of the polygon corresponding to the safety distance.

22. A device for guiding a vehicle in a surrounding environment of an object, comprising:

a producing device for producing a three-dimensional image in the form of a disparity map based on a first image and a second image of a stereo camera, a specified distance value being assigned to each of a multiplicity of points of the three-dimensional image;

a read-in device for reading in a multiplicity of view ray endpoints in the three-dimensional image of the surrounding environment, containing the object and/or the vehicle, and at least one of the view ray endpoints representing an outer surface of the object;

a determining device for determining a selection of points from the multiplicity of points of the three-dimensional image, which represent the object and/or an end of a region of view of the stereo camera, as the multiplicity of view ray endpoints of the three-dimensional image, wherein in the determining, the selection of the points takes place through line-by-line scanning and column-by-column combining of the multiplicity of points of the three-dimensional image and, in the column-by-column combining, a relative speed between the vehicle and the object and/or the end of the region of view is taken into account to compensate a line-by-line offset of the points inside the three-dimensional image;

a connecting device for connecting the multiplicity of view ray endpoints to form a polygon that represents a free surface to be traveled by the vehicle; and a generating device for generating a driving corridor, provided for the vehicle, for driving around the object, based on the free surface.

23. The device of claim 22, wherein one or more sides of the polygon define an edge of the free space, the one or more sides defining a boundary between the polygon and the object, and wherein the generating of the driving corridor includes:

determining a safety distance between the vehicle and the one or more sides of the polygon, wherein a size of the safety distance varies as a function of a classification of the object, and defining at least one lateral edge of the driving corridor, a distance between the at least one lateral edge of the driving corridor and the one or more sides of the polygon corresponding to the safety distance.

24. A non-transitory computer readable medium having a computer program, which is executable by a processor, comprising:

a program code arrangement having program code for computer program product having program code guiding a vehicle in a surrounding environment of an object, by performing the following:

producing a three-dimensional image in the form of a disparity map based on a first image and a second image of a stereo camera, a specified distance value being assigned to each of a multiplicity of points of the three-dimensional image;

reading in a multiplicity of view ray endpoints in the three-dimensional image of the surrounding environment, containing the object and/or the vehicle, and at least one of the view ray endpoints representing an outer surface of the object;

determining a selection of points from the multiplicity of points of the three-dimensional image, which represent the object and/or an end of a region of view of the stereo camera, as the multiplicity of view ray endpoints of the three-dimensional image, wherein in the determining, the selection of the points takes place through line-by-line scanning and column-by-column combining of the multiplicity of points of the three-dimensional image and, in the column-by-column combining, a relative speed between the vehicle and the object and/or the end of the region of view is taken into account to compensate a line-by-line offset of the points inside the three-dimensional image;

connecting the multiplicity of view ray endpoints to form a polygon that represents a free surface to be traveled by the vehicle; and generating a driving corridor, provided for the vehicle, for driving around the object, based on the free surface.

25. The computer readable medium of claim 24, wherein one or more sides of the polygon define an edge of the free space, the one or more sides defining a boundary between the polygon and the object, and wherein the generating of the driving corridor includes:

determining a safety distance between the vehicle and the one or more sides of the polygon, wherein a size of the safety distance varies as a function of a classification of the object, and defining at least one lateral edge of the driving corridor, a distance between the at least one lateral edge of the driving corridor and the one or more sides of the polygon corresponding to the safety distance.

* * * * *